Jan. 9, 1940. W. A. RAY 2,186,707
THERMOCOUPLE STRUCTURE
Filed Feb. 8, 1939
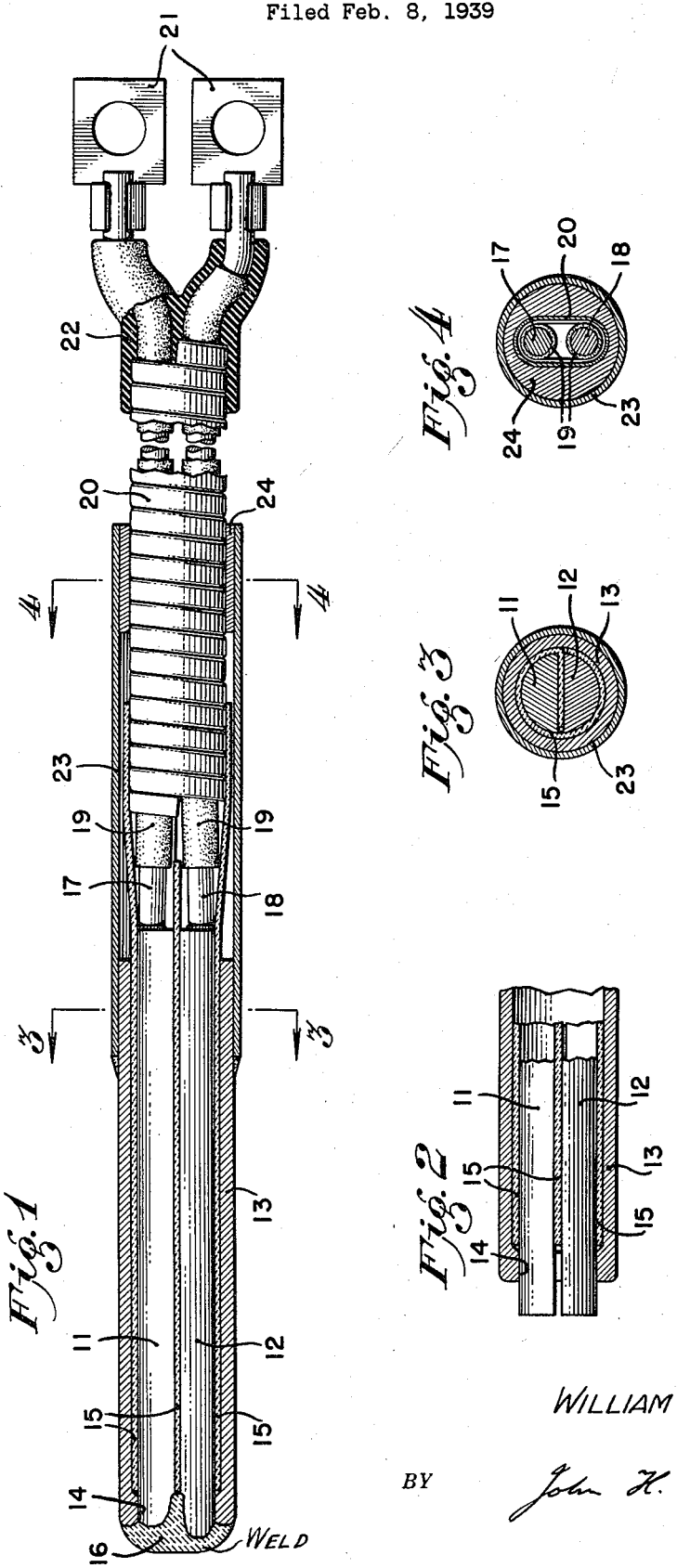
WILLIAM A. RAY,
INVENTOR.
BY John H. Rouse
ATTORNEY

UNITED STATES PATENT OFFICE 2,186,707

THERMOCOUPLE STRUCTURE

William A. Ray, Glendale, Calif.

Application February 8, 1939, Serial No. 255,285

7 Claims. (Cl. 136—4)

My present invention relates to thermocouples and has for its main object the provision of a thermocouple structure which is simple and inexpensive to manufacture.

Another object is the provision of a thermocouple structure in which the elements are compactly and effectively arranged.

Still another object is the provision of a structure in which means is provided for shielding the thermocouple elements from the corrosive action of the flame by which they are heated, which means is integrally joined to the hot junction end of said elements so that efficient transfer of heat to the elements is effected.

Other objects and advantages of my invention will be found in the description, the drawing and the appended claims.

For complete understanding of the invention, reference may be had to the following detailed description and the accompanying drawing in which:

Figure 1 is a longitudinal sectional view of a thermocouple structure embodying my invention;

Figure 2 is a fragmentary sectional view of the elements of the thermocouple structure shown in Fig. 1, illustrating a step in its manufacture;

Figure 3 is a section taken along the line 3—3 of Fig. 1; and

Figure 4 is a section taken along the line 4—4 of Fig. 1.

In the drawing, the numerals 11 and 12 denote elongated thermocouple elements of thermoelectrically dissimilar metals, spaced from one another throughout their length, and of semicylindrical shape in cross section. The element 11 may preferably be composed of "copel" and element 12 of "chromel", which metals have the property of generating high thermoelectric potentials when a junction formed between them is heated. According to my invention, however, other thermoelectrically dissimilar metals may be employed.

Surrounding elements 11 and 12, and spaced from the longitudinal surfaces thereof, is a tubular member 13 which may be formed of stainless steel, or other heat resistant metal which is not readily corroded by the action of a gas flame or high temperatures. The outer end portion of the member 13 has a reduced bore 14, substantially fitting the curved surfaces of the spaced elements 11 and 12.

The spaces between the plane surfaces of the elements 11 and 12 and between the outer surfaces of these elements and the inner side wall of member 13 are preferably provided with heat resistant insulating material such as mica. This material serves both to electrically insulate the parts and also, to some degree, to thermally insulate the cold-junction end portions of the elements 11 and 12.

Conveniently, a single sheet of mica 15 may be inserted between the plane surfaces of the elements and wrapped in a single layer around their outer surfaces, as shown in Fig. 3.

With the parts 11, 12, 13 and 15 in assembled relation, as shown in Fig. 2, a welding flame is applied to the end portions of elements 11 and 12, causing them to fuse together to form the portion 16 which unites with the end portion of the member 13, integrally joining the elements 11 and 12 and the member 13 together. The bond thus formed permits efficient transfer of heat to the hot junction of elements 11 and 12 when, in operation, the outer end portion of the structure is subjected to the heat of a flame or other means.

Leads 17 and 18, of heavy copper wire, are welded to the inner end portions of the elements 11 and 12. These leads have insulating coverings 19 of heat resistant material such as asbestos and are enclosed in a flexible protective sheath or armor cable 20. Leads 17 and 18 are as large in diameter as is practical, not only to minimize electrical losses, but also so as to provide effective means for conducting heat away from the inner, or cold-junction, ends of elements 11 and 12 whereby high thermoelectrical output from the device results. The outer ends of the leads are provided with connection terminals 21 and around the outer end portions of the cable 20 and of the leads is molded a rubber protective member 22.

A relatively thin-walled metallic tubular member 23 is brazed to the member 13 and depends therefrom to surround and protect the connecting end portions of elements 11 and 12 and leads 17 and 18. An extended portion of the mica insulating sheet 15 may be wrapped around the inner end portion of the cable 20, the central portion of the sheet being cut away at this end, to ensure electrical insulation of the inner end portions of the leads. A bushing 24, having a broached opening conforming to the external form of the cable 20 and receivable within the member 23, supports the cable so that strain on the inner end of the leads, caused by flexure of the cable, is minimized.

From the foregoing description it will be seen that, by my invention, I have provided an effective and compact thermocouple structure which has particular utility as a source of electrical energy for the operation of electrical devices such as relays, valves and other control devices.

It is obvious that modifications in the structure which I have shown and described may be made without departing from the spirit of my invention and I intend therefore that my invention be limited only by the scope of the appended claims.

I claim as my invention:

1. A thermocouple structure comprising a pair of elongated elements of semicylindrical shape in cross section and disposed in spaced relation with their plane surfaces adjacent, said elements being composed of thermoelectrically dissimilar metals, and a hollow metallic member surrounding said elements and spaced therefrom throughout their length, the adjacent portions at one end of said elements and of said member being rigidly joined together to form a hot junction.

2. A thermocouple structure comprising a pair of elongated elements of semicylindrical shape in cross section and disposed in spaced relation with their plane surfaces adjacent, said elements being composed of thermoelectrically dissimilar metals, and a hollow metallic member surrounding said elements and spaced therefrom throughout their length, the adjacent portions at one end of said elements and of said member being integrally secured together by fusion to form a hot junction.

3. A thermocouple structure comprising a pair of elongated elements of semicylindrical shape in cross section and disposed in spaced relation with their plane surfaces adjacent, said elements being composed of thermoelectrically dissimilar metals, and a tubular metallic member surrounding said elements and having an inner wall conforming to the curvature of the longitudinal surfaces of said elements and providing clearance therewith, the adjacent portions at one end of said elements and of said member being integrally joined together by fusion to form a hot junction.

4. A thermocouple structure comprising a pair of elongated elements of semicylindrical shape in cross section and disposed in spaced relation to one another with their plane surfaces adjacent, said elements being composed of thermoelectrically dissimilar metals, insulating material between said plane surfaces, and a hollow metallic member surrounding said elements and spaced therefrom throughout their length, the adjacent portions at one end of said elements and of said member being rigidly joined together to form a hot junction.

5. A thermocouple structure comprising a pair of elongated elements of semicylindrical shape in cross section and disposed in spaced relation to one another with their plane surfaces adjacent, said elements being composed of thermoelectrically dissimilar metals, insulating material between said plane surfaces, a hollow cylindrical metallic member surrounding said elements and providing clearance with the longitudinal cylindrical surfaces thereof, and insulating material in said clearance, said elements and said insulating material substantially completely filling the space within said cylindrical member, the adjacent portions at one end of said member and of said elements being integrally joined together.

6. A thermocouple structure comprising a pair of elongated elements of semicylindrical shape in cross section and disposed in spaced relation to one another with their plane surfaces adjacent, said elements being composed of thermoelectrically dissimilar metals, insulating material between said plane surfaces, a protective tubular member of heat resistant metal surrounding and in spaced relation to said elements and substantially coextensive in length therewith, and insulating material between said member and said elements, said elements and said insulating material substantially completely filling the space within said tubular member, the adjacent portions at one end of said elements and of said member being integrally joined together.

7. A thermocouple structure comprising a pair of elongated elements of semicylindrical shape in cross section and disposed in spaced relation to one another with their plane surfaces adjacent, said elements being composed of thermoelectrically dissimilar metals, insulating material between said plane surfaces, a protective tubular member of heat resistant metal surrounding and in spaced relation to said elements and substantially coextensive in length therewith, insulating material between said member and said elements, said elements and said insulating material substantially completely filling the space within said tubular member, the adjacent portions at one end of said elements and of said member being integrally joined together, a pair of lead members of high thermal conductivity integrally united to each of the other ends of said elements, and a relatively thin tubular extension dependent from said tubular member and surrounding the inner portion of said lead members.

WILLIAM A. RAY.